US008374447B2

(12) United States Patent
Haskell et al.

(10) Patent No.: US 8,374,447 B2
(45) Date of Patent: *Feb. 12, 2013

(54) METHOD AND APPARATUS TO PRIORITIZE VIDEO INFORMATION DURING CODING AND DECODING

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/181,965

(22) Filed: Jul. 13, 2011

(65) Prior Publication Data

US 2011/0268189 A1 Nov. 3, 2011

Related U.S. Application Data

(63) Continuation of application No. 12/624,003, filed on Nov. 23, 2009, now Pat. No. 7,983,499, which is a continuation of application No. 11/271,225, filed on Nov. 12, 2005, now Pat. No. 7,630,570, which is a continuation of application No. 09/072,784, filed on May 6, 1998, now abandoned.

(51) Int. Cl.
*G06K 9/36* (2006.01)
*H04N 7/12* (2006.01)
(52) U.S. Cl. .................................. 382/243; 375/240.12
(58) Field of Classification Search .................. 382/243; 375/240.12
See application file for complete search history.

(56) References Cited

U.S. PATENT DOCUMENTS

| 5,764,807 | A | 6/1998 | Pearlman et al. |
| 5,896,176 | A | 4/1999 | Das et al. |
| 6,005,980 | A | 12/1999 | Eifrig et al. |
| 6,025,877 | A * | 2/2000 | Chang et al. ............. 375/240.01 |
| 6,097,842 | A | 8/2000 | Suzuki et al. |
| 7,199,836 | B1 | 4/2007 | Eleftheriadis et al. |
| 7,630,570 | B1 | 12/2009 | Haskell et al. |
| 7,983,499 | B2 * | 7/2011 | Haskell et al. ................ 382/243 |
| 2009/0245389 | A1 | 10/2009 | Eleftheriadis et al. |

OTHER PUBLICATIONS

"Coding of Moving Pictures and Audio", ISO/IEC JTC1/SC29/WG11 N1993, San Jose, Feb. 1998.
Thomas Sikora, "The MPEG-4 Video Standard Verification Model", IEEE Transactions on Circuits and Systems for Video Technology, vol. 7, No. 1, Feb. 1997, pp. 19-31.
"Coding of Moving Pictures and Associated Audio Information", ISO/IEC JTC1/SC29/WG11, MPEG96, Jan. 1996.
Ad hoc group on MPEG-4 video VM editing, "MPEG-4 Video Verification Model Version 3.0", ISO/IEC JTC1/SC29/WG11, N1277, Jul. 1996.

(Continued)

*Primary Examiner* — Wenpeng Chen

(57) ABSTRACT

A method and apparatus prioritizing video information during coding and decoding. Video information is received and an element of the video information, such as a visual object, video object layer, video object plane or keyregion, is identified. A priority is assigned to the identified element and the video information is encoded into a bitstream, such as a visual bitstream encoded using the MPEG-4 standard, including an indication of the priority of the element. The priority information can then be used when decoding the bitstream to reconstruct the video information.

22 Claims, 4 Drawing Sheets

OTHER PUBLICATIONS

ISO/IEC 13818-2:2000(e), "Information Technology-Generic coding of moving pictures and associated audio information: Video", International Standard, Second Edition Dec. 15, 2000.

ISO/IEC 13818-2:2000/Cor:1:2002(e), "Information Technology-Generic coding of moving pictures and associated audio information: Video", Technical Corrigendum 1, Mar. 1, 2002.

ISO/IEC 13818-2:2000/Cor:2:2007(e), "Information Technology-Generic coding of moving pictures and associated audio information: Video", Technical Corrigendum 2, Jul. 1, 2007.

Puri, Atul. "Report of Ad hoc Group on Multi-functional Coding in MPEG-4 Video", ISO/IEC JTC1/SC29/WG11, MPEG 97/1702, Feb. 1996.

Puri et al., "KeyRegions: Improved slices for MPEG-4 Video", ISO/IEC JTC1/SC29/WG11 MPEG97/1704, Feb. 1997.

Puri et al., "Simplified KeyRegions from Error Resilience Syntax", ISO/IEC JTC1/SC29/WG11 MPEG97/2487, Jul. 1997.

Chiariglione, Leonardo, "Resolutions of $42^{nd}$ WG11 meeting", ISO/IEC JTC1/SC29/WG11, N1976, Feb. 1998.

Puri et al., "Working Draft4.0 of ISO/IEC 14496-2", ISO/IEC JTC1/SC29/WG11 N1797, Jul. 1997.

Information Technology, "Coding of Audio-Visual Objects: Visual", ISO/IEC 14496-2, ISO/IEC JTC1/SC29/WG11 N1902 Committee Draft, Nov. 21, 1997.

Meares, David, "Bibliogaphy of WG11 Output Documents", NO965 to 2247, Jul. 1995 to Mar. 1998, ISO/IEC JTC 1/SC 29/WG 11 N2290, Jul. 1998.

* cited by examiner

METHOD AND APPARATUS TO PRIORITIZE VIDEO INFORMATION DURING CODING AND DECODING

CROSS REFERENCE TO RELATED APPLICATIONS

The present application is a continuation of U.S. patent application Ser. No. 12/624,003, filed Nov. 23, 2009, now U.S. Pat. No. 7,983,499, which is a continuation of U.S. patent application Ser. No. 11/271,225, filed Nov. 12, 2005, now U.S. Pat. No. 7,630,570, which is a continuation of U.S. patent application Ser. No. 09/072,784, filed on May 6, 1998, now abandoned, the contents of which is incorporated herein by reference in its entirety.

The subject matter of the present application is related to the subject matter of U.S. patent application Ser. No. 08/986,118, now abandoned, entitled "Video Objects Coded By Key-regions" to Barin Geoffry Haskell, Atul Puri and Robert Lewis Schmidt, and filed on Dec. 5, 1997, the entire disclosure of which is hereby incorporated by reference.

FIELD OF THE INVENTION

The invention relates to video coding. More particularly, the invention relates to a method and apparatus to prioritize video information during coding and decoding.

BACKGROUND OF THE INVENTION

Audiovisual information, such as a video of a person speaking, can be converted into a digital signal and transmitted over a communications network. The digital signal can then be converted back into audiovisual information for display. At the time of this writing, the Moving Picture Experts Group (MPEG) of the International Standardization Organization (ISO) is developing a new standard, known as MPEG-4, for the encoding of audiovisual information that will be sent over a communications network at a low transmission rate, or "bitrate." When complete, MPEG-4 is expected to enable interactive mobile multimedia communications, video phone conferences and a host of other applications.

These applications will be achieved by coding visual objects, which include natural or synthetic video objects, into a generalized coded bitstream representing video information, referred to as a "visual" bitstream. A bitstream that contains both visual and audio information is also referred to as a "systems" bitstream.

A video object is a specific type of natural visual object, and is further composed of layers called Video Object Layers (VOLs). Each VOL is composed of Video Object Planes (VOPs), which can be thought of as snapshots in time of a VOL. The advent of video objects and VOPs in video coding permits significant coding savings by selectively apportioning bits among parts of the frame that require a relatively large number of bits and other parts that require a relatively small number of bits. VOPs also permit additional functionality, such as object manipulation.

As an example, FIG. 1 illustrates a frame 100 for coding that includes the head and shoulders of a narrator 110, a logo 120 suspended within the frame 100 and a background 130. The logo 120 may be static, having no motion and no animation. In such a case, bit savings may be realized by coding the logo 120 only once. For display, the coded logo 120 could be decoded and displayed continuously from the single coded representation. Similarly, it may be desirable to allocate fewer bits for coding a semi-static or slowly moving background 130. Bit savings realized by coding the logo 120 and background 130 at lower rates may permit coding of the narrator 110 at a higher rate, where the perceptual significance of the image may reside. VOPs are suited to such applications. FIG. 1 also illustrates the frame 100 broken into three VOPs. By convention, a background 130 is generally assigned VOP0. The narrator 110 and logo 120 may be assigned VOP1 and VOP2, respectively. Of course, other number schemes can also be used to label these regions.

Note that not all elements within a VOP will merit identical treatment. For example, certain areas within a VOP may require animation, whereas others may be relatively static. Consider the example of VOP 1 in FIG. 1. The perceptually significant areas of VOP 1 center around the facial features of the figure. The clothes and hair of the narrator 110 may not require animation to the same extent that the facial features do. Accordingly, as disclosed in U.S. patent application Ser. No. 08/986,118 entitled "Video Objects Coded by Keyregions," keyregions may be used to emphasize certain areas of a VOP over others.

The object based organization of MPEG-4 video, in principle, will provide a number of benefits in error robustness, quality tradeoffs and scene composition. The current MPEG-4 standards, however, lack a number of tools, and their associated syntax and semantics, to fully and flexibly exploit this object based organization. In particular, there is no way to identify an element, such as a visual object, VOL or keyregion, as more important than other elements of the same type.

For example, a higher degree of error robustness would be achieved if a higher priority could be assigned to the foreground speaker object as compared to a less relevant background object. If an encoder or decoder can only process a limited number or objects, it would be helpful to have the encoder or decoder know which objects should be processed first.

Moreover, because the MPEG-4 system will offer scene description and composition flexibility, reconstructed scenes would remain meaningful even when low priority objects are only partially available, or even totally unavailable. Low priority objects could become unavailable, for example, due to data loss or corruption.

Finally, in the event of channel congestion, identifying important video data would be very useful because such data could be scheduled for delivery ahead of less important video data. The remaining video data could be scheduled later, or even discarded. Prioritization would also be useful for graceful degradation when bandwidth, memory or computational resources become limited.

In view of the foregoing, it can be appreciated that a substantial need exists for a method and apparatus to prioritize video objects when they are coded, and solving the other problems discussed above.

SUMMARY OF THE INVENTION

The disadvantages of the art are alleviated to a great extent by a method and apparatus to prioritize video information during coding and decoding. To extract further benefits from the object based organization of coded, visual or video data, the present invention associates priorities with visual objects, VOLs, and keyregions. The priorities for visual objects and VOLs can be made optional, if desired. Those for keyregions can be made mandatory, because the keyregions themselves are optional.

According to an embodiment of the present invention, video information is received and an element of the video information, such as a visual object, VOL or keyregion, is identified. A priority is assigned to the identified element and the video information is encoded into a bitstream, such as a visual bitstream, including an indication of the priority of the element. The priority information can then be used when decoding the bitstream to reconstruct the video information.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
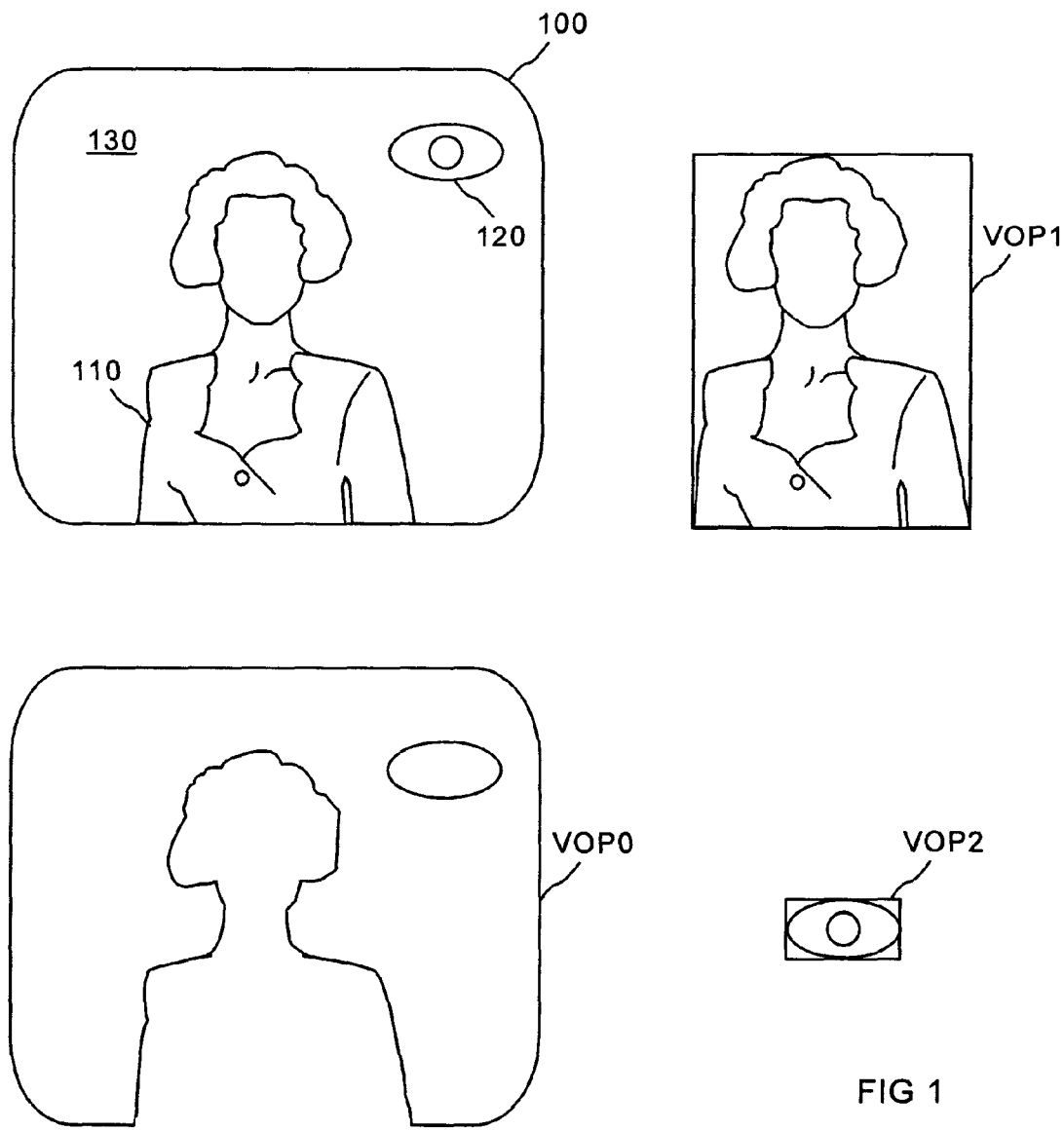
FIG. 1 illustrates a video frame and video objects from the frame to be coded according to the present invention.
Figure 2:
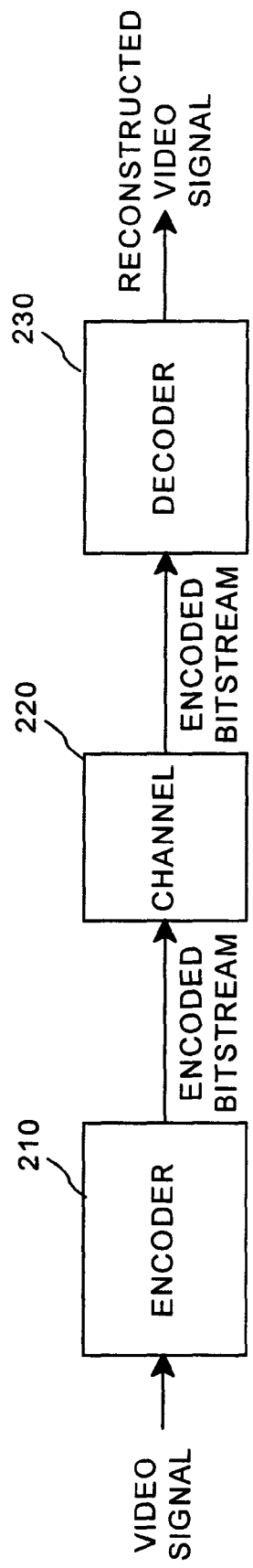
FIG. 2 is a block diagram of an embodiment of the present invention.

The present invention is directed to a method and apparatus to prioritize video information during coding and decoding. Referring now in detail to the drawings wherein like parts are designated by like reference numerals throughout, there is illustrated in FIG. 2 a block diagram of an embodiment of the present invention. An encoder 210 receives, through an input port, a video signal representative of a frame or frames to be coded. The video signal is sampled and organized into macroblocks which are spatial areas of each frame. The encoder 210 codes the macroblocks and outputs an encoded bitstream, through an output port, to a channel 220.

The bitstream contains groupings of macroblocks organized and coded as VOPs. The channel 220 may be a radio channel or a computer network. Instead of the communication channel 220, the encoded bitstream could be sent to some storage media, such as a memory or a magnetic or optical disk (not shown in FIG. 2). A decoder 230 retrieves the bitstream through an input port from the channel 220, or from the storage medium, and reconstructs a video signal. The reconstructed video signal can be output through an output port for display.

The encoder 210 defines a VOP in the bitstream by generating a VOP header. VOP headers define the position and size of the VOP. It also indicates the presence of shape information. After decoding a VOP header, the decoder 230 can determine how many macroblocks are contained in the VOP. The decoder 230 also knows the video objects, VOLs and keyregions that comprise the image.

According to the present invention, each video object, VOL and keyregion can be assigned a priority to indicate its significance. In case of channel errors, congestion or limitation of bandwidth, memory or processor resources, preference can be given to video data elements with high priority.

The assignment of priorities to video objects and VOLs is included directly into the video bitstream. In addition, priorities could be assigned to specific VOPs or to types of VOPs. In fact, VOP types themselves tend to a form of automatic prioritization. For example, VOPs that are coded using motion compensated prediction from past and/or future reference VOPs, known as bidirectionally predictive-coded VOPs (B-VOPs), are noncausal and do not contribute to error propagation. Thus, B-VOPs can be assigned a lower priority and perhaps can even be discarded in case of severe errors. On the other hand, VOPs coded using information only from themselves, known as an intra-coded VOPs (I-VOPs), may be assigned the highest priority. In this way, the implicit nature of priorities for VOP types can be exploited. Priorities can also be assigned, however, to important regions within each VOP. This can be accomplished by assigned priorities to keyregions.

The assignment of priorities to various types of coded video data, such as visual objects, VOLs, VOPs or keyregions, can be handled either during or after the encoding process performed by the encoder 210, so long as the coded bitstream carries the priority information over the channel 220. The priority information for video objects, VOLs and VOPs can be made optional, if desired. It should be noted that priorities can be implemented for any combination of these elements, depending on the application. The priority information for keyregions can be made mandatory, because the use of a keyregion itself is considered optional.

Figure 3:
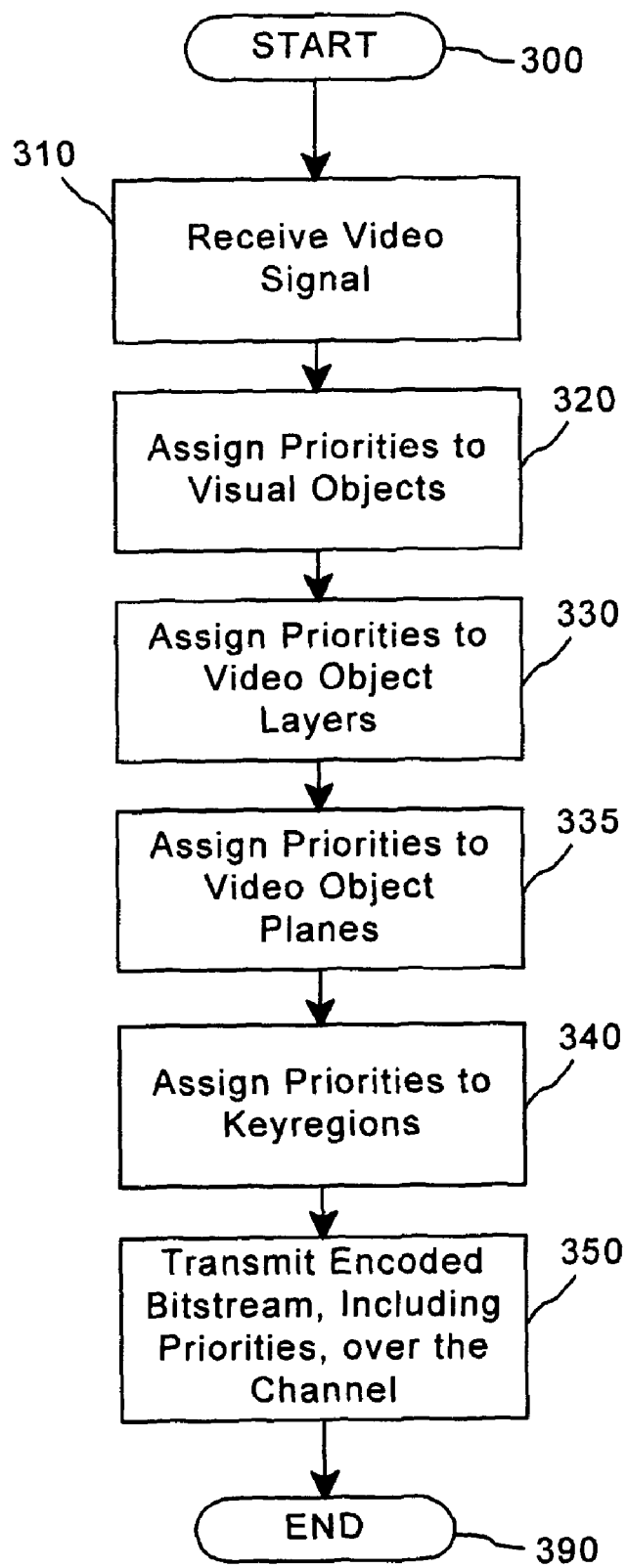
FIG. 3 illustrates the operation of a encoder according to an embodiment of the present invention.

FIG. 3 illustrates the operation of the encoder 210 according to an embodiment of the present invention. After beginning at step 300, video information, such as a video signal, is received at step 310. Priorities are assigned to the visual object elements in the video signal at step 320. The visual object priority information is assumed to be optional. When present, priority information is carried by a specific codeword in the visual bitstream or included as part of the object descriptor in a systems bitstream. Priorities are assigned to VOLs at step 330, VOPs at step 335, and to keyregions at step 340, also using specific codewords in the visual bitstream. The VOL priority information is assumed to be optional. When present, the priority information is carried by a specific codeword in the visual bitstream. The keyregion priority information is also carried by a specific codeword in the visual bitstream, in the keyregion class. At step 350 the encoder 210 transmits the encoded bitstream, including the priority information, over the channel 220 and the process ends at step 390.

If desired, such a method could allow the encoder 210 to transmit high priority elements in the bitstream first, and even discard lower priority items if required. Blank information, older information or extrapolated information could be used in place of the discarded lower priority items. Such schemes could provide a graceful degradation of image quality in the event of limited bandwidth or limited memory or computational power. Such limitations could occur at the encoder 210, along the channel 220 or at the decoder 230.

Figure 4:
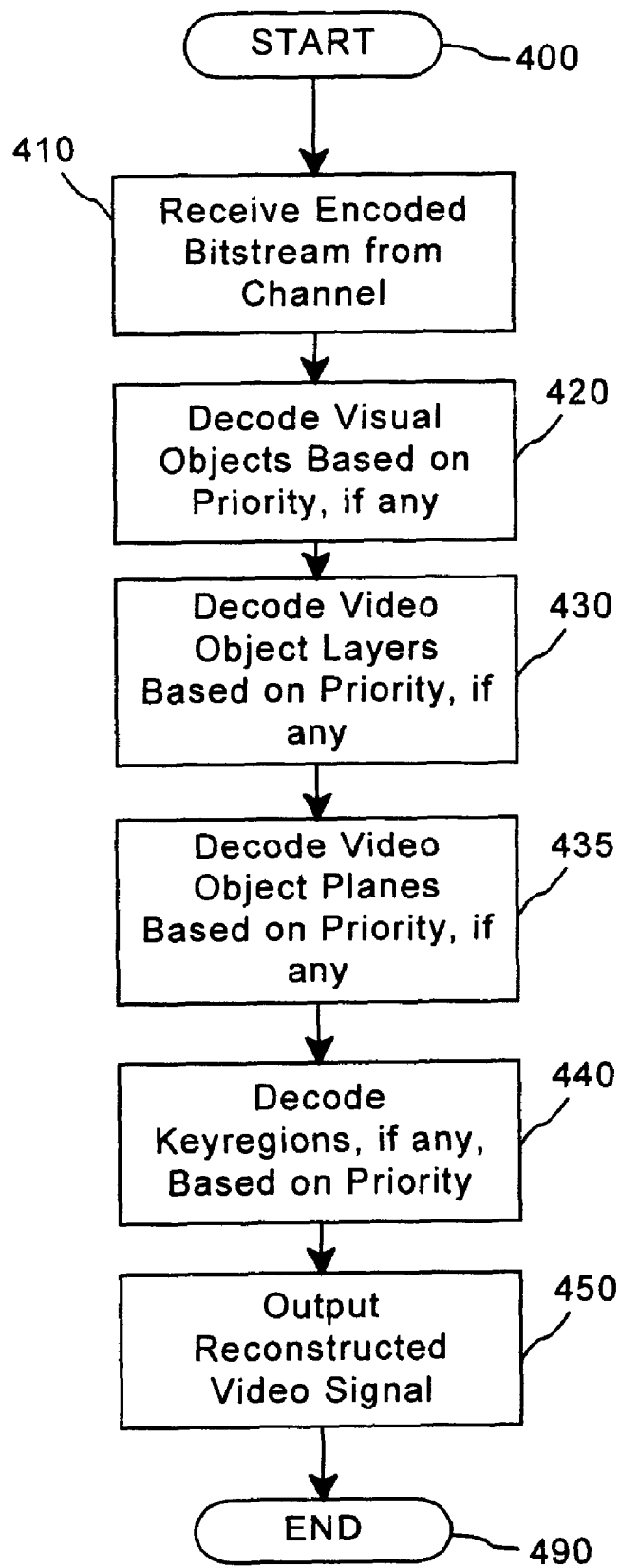
FIG. 4 illustrates the operation of a decoder according to an embodiment of the present invention.

Similarly, FIG. 4 illustrates the operation of the decoder 230 according to an embodiment of the present invention. After beginning at step 400, an encoded bitstream is received at step 410 from the channel 220. Visual objects are decoded from the bitstream based on the priority information, if any, contained in a specific codeword in the visual bitstream, or included as part of the object descriptor in a systems bitstream, at step 420. VOLs are decoded from the bitstream based on the priority information, if any, carried by a specific codeword in the visual bitstream at step 430. VOPs are similarly decoded from the bitstream based on priority at step 435. Finally, keyregions are decoded from the bitstream based on the priority information contained in a specific codeword in the visual bitstream, in the keyregion class, at step 440. At step 450 the decoder 230 outputs the reconstructed video signal and the process ends at step 490.

As with the encoder 210, such a method could let the decoder 230 first decode those elements that have the highest priority.

An embodiment of the present invention, including syntax additions and changes, and related semantics, that can be used to implement the various priorities discussed above in the ongoing draft of the MPEG-4 specification is provided below.
Visual Object (or Video Object) Class Syntax Modification The following structure can be used when assigning a priority to a visual object:

```
is_visual_object_identifier    1
if (is visual_object_identifier) {
  visual_object_priority       3
}
```

The term is_visual_object_identifier represents a single bit code which when set to "1" indicates that priority is specified for the visual object. When set to "0," priority does not need to be specified. The term visual_object_priority represents a three bit code which specifies the priority of the visual object. It takes values between 1 and 7, with 1 representing the highest priority and 7 the lowest priority. The value of zero is reserved.

VOL Class Syntax Modification

The following structure can be used when assigning a priority to a VOL:

```
is_video_object_layer_identifier    1
if (is_video_object_layer_identifier) {
  video_object_layer_priority       3
}
```

The term is_video_object_layer_identifier represents a single bit code which when set to "1" indicates that priority is specified for the video object layer. When set to "0," priority does not need to be specified. The term video_object_layer_priority represents a three bit code which specifies the priority of the video object layer. It takes values between 1 and 7, with 1 representing the highest priority and 7 the lowest priority. The value of zero is reserved.

VOP Class Syntax Modification

The following structure can be used when assigning a priority to a VOP:

```
is video_object_plane_identifier    1
if (is_video_object_plane_identifier) {
  video object_plane_priority       3
}
```

The term is_video_object_plane_identifier represents a single bit code which when set to "1" indicates that priority is specified for the video object plane. When set to "0," priority does not need to be specified. The term video_object_plane_priority represents a three bit code which specifies the priority of the video object plane. It takes values between 1 and 7, with 1 representing the highest priority and 7 the lowest priority. The value of zero is reserved.

Keyregion Class Syntax Addition

The following structure can be used when assigning a priority to a keyregion:

keyregion_priority 3

The term keyregion_priority represents a three bit code which specifies the priority of the keyregion. It takes values between 1 and 7, with 1 representing the highest priority and 7 the lowest priority. The value of zero is reserved.

As is known in the art, the methods described above can be performed by hardware, software, or some combination of software and hardware. When performed by software, the methods may be executed by a processor, such as a general purpose computer, based on instructions stored on a medium. Examples of a medium that stores instructions adapted to be executed by a processor include a hard disk, a floppy disk, a Compact Disk Read Only Memory (CD-ROM), flash memory, and any other device that can store digital information. If desired, the instructions can be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

At the time of this writing, the MPEG-4 video standard is being drafted. The priority coding scheme of the present invention has been proposed for integration into the MPEG-4 video standard. Although various embodiments are specifically illustrated and described herein, it will be appreciated that modifications and variations of the present invention are covered by the above teachings and within the purview of the appended claims without departing from the spirit and intended scope of the invention. For example, although priority levels from 1 to 7 have been used to illustrate the present invention, it can be appreciated that other levels of priority will also fall within the scope of the invention. Moreover, the present invention can be used in coding schemes besides the MPEG-4 system. Specifically, the present invention can be used whenever video information with elements having different priorities is to be encoded into a bitstream or decoded from a bitstream.

What is claimed:

1. A method comprising:
   receiving, in a bitstream, a video object layer priority code of at least 2 bits which specifies a priority of a video object layer, the video object layer priority code taking values between 1 and 7 inclusive; and
   decoding a video object plane associated with the video object layer to generate video data from the bitstream.

2. The method of claim 1, further comprising receiving a video object layer identifier code in the bitstream, wherein the video object layer identifier code indicates whether a priority has been specified for the video object layer.

3. The method of claim 2, wherein the video object layer identifier code comprises an is_video_object_layer_identifier flag and the video object layer priority code comprises a video_object_layer_priority code.

4. The method of claim 2, wherein causal video object planes are assigned to a first video object layer and non-causal video object planes are assigned to a second video object layer.

5. The method of claim 2, wherein intra-coded video object planes and predictive coded video object planes are assigned to a first video object layer and bidirectionally-predictive coded video object planes are assigned to a second video object layer.

6. The method of claim 2, wherein the video object layer priority code is a 3-bit code.

7. The method of claim 2, wherein 1 represents a higher priority and 7 represents a lower priority.

8. A method comprising:
   receiving, in a bitstream, a video object layer priority code of at least 2 bits which specifies a priority of a video object layer, the video object layer priority code taking values between 1 and 7 inclusive; and decoding, via a decoder, a video object plane associated with the video object layer to generate video data from the bitstream.

9. The method of claim 8, further comprising receiving a video object layer identifier code in the bitstream, wherein the video object layer identifier code indicates whether a priority is specified for the video object layer.

10. The method of claim 8, wherein the video object layer identifier code comprises an is_video_object_layer_identifier flag and the video object layer priority code comprises a video_object_layer_priority code.

11. The method of claim 8, wherein causal video object planes are assigned to a first video object layer and non-causal video object planes are assigned to a second video object layer.

12. The method of claim 8, wherein intra-coded video object planes and predictive coded video object planes are assigned to a first video object layer and bidirectionally-predictive coded video object planes are assigned to a second video object layer.

13. The method of claim 8, wherein the video object layer priority code is a 3-bit code.

14. The method of claim 8, wherein 1 represents a higher priority and 7 represents a lower priority.

15. A non-transitory computer-readable storage medium storing instructions which, when executed by a computing device, cause the computing device to perform a method, the method comprising:

receiving, in a bitstream, a video object layer priority code of at least 2 bits which specifies a priority of a video object layer, the video object layer priority code taking values between 1 and 7;

decoding video object planes of the video object layer to yield decoded video object planes; and outputting video data based on the decoded video object planes.

16. The non-transitory computer-readable storage medium of claim 15, receiving a video object layer identifier code that indicates whether a priority has been specified for the video object layer.

17. The non-transitory computer-readable storage medium of claim 15, wherein the video object layer identifier code comprises an is_video_object_layer_identifier flag and the video object layer priority code comprises a video_object_layer_priority code.

18. The non-transitory computer-readable storage medium of claim 15, wherein the video object layer priority code is a 3-bit code.

19. The non-transitory computer-readable storage medium of claim 15, wherein 1 represents a higher priority and 7 represents a lower priority.

20. A decoder comprising:

a processor;

a first module configured to control the processor to receive, from a bitstream, a video object layer priority code of at least 2 bits which specifies a priority of a video object layer, the video object layer priority code taking values between 1 and 7 inclusive; and a second module configured to control the processor to decode a video object plane associated with the video object layer to generate video data from the bitstream.

21. The decoder of claim 20, further comprising:

a third module configured to control the processor to receive a video object layer identifier code in the bitstream, wherein the video object layer identifier code that indicates whether a priority has been specified for the video object layer.

22. The decoder of claim 20, wherein 1 represents a higher priority and 7 represents a lower priority.

* * * * *